United States Patent [19]

Grivérus

[11] 3,827,297
[45] Aug. 6, 1974

[54] FLOW METER PROVIDED WITH A VORTEX CHAMBER

[76] Inventor: Tor Lennart Bernt Grivérus, Nasbydalsvagen 6, 183 31 Taby, Sweden

[22] Filed: Oct. 30, 1972

[21] Appl. No.: 302,021

[30] Foreign Application Priority Data
Nov. 10, 1971 Sweden............................ 14334/71
July 18, 1972 Sweden............................. 9460/72

[52] U.S. Cl..................... 73/194 C, 73/229, 73/253
[51] Int. Cl.......... G01p 5/06, G01f 1/00, G01f 1/06
[58] Field of Search...... 73/194 C, 253, 255, 194 E, 73/194 M, 194 R, 229

[56] References Cited
UNITED STATES PATENTS
2,518,149  8/1950  Kearsley........................... 73/194 E
3,443,432  5/1969  Shonn et al..................... 73/194 M

FOREIGN PATENTS OR APPLICATIONS
44-20898  2/1966  Japan.............................. 73/194 C

*Primary Examiner*—James J. Gill
*Attorney, Agent, or Firm*—Woodhams, Blanchard & Flynn

[57] ABSTRACT

A flow meter for measuring the flow parameters of liquid, gaseous and multicomponent media is comprised of a housing encompassing a flow chamber through which the medium flows while passing in a swirling movement three distinct, concentric flow zones, there being an inlet zone, an outlet zone and an intermediate sensing zone in which the flow parameters of the medium can be sensed and measured. Means are provided in the inlet zone for guiding the medium in a manner such that all particles thereof cross the interface between the inlet zone and the sensing zone uniformly, that is to say, at the same speed and at the same angle to a radius extending from said interface to the centre of the outlet zone.

15 Claims, 17 Drawing Figures

FLOW METER PROVIDED WITH A VORTEX CHAMBER

The present invention relates to an improvement in flow meters, i.e. devices constructed to measure the flow parameters of flowing media. By flow parameters is meant the physical magnitudes normally of interest with respect to flowing fluids or multicomponent media. Examples of such magnitudes include mass flow, volume flow and rate of flow. The improvement provided by the invention, however, is not intended solely for application with conventional methods of measuring fluids flow parameters, but can also be used with regulating and monitoring systems, as a transducer element for producing a control signal which is linearly dependent on the flow parameters of the fluid.

Flow meters are known to the art in which the medium being measured is fed tangentially into a circular or annular chamber and caused to pass therethrough while performing a rotary or circulatory movement. Arranged in the chamber is an element for detecting the flow parameters of the flowing medium, this element normally taking the form of a freely movable ball which accompanies the circulating medium and moves in an endless path around the chamber walls. Inlet and outlet passages are arranged to extend in towards the chamber in a manner such that with each revolution the ball passes each entry jet of medium entering the chamber. The movement of the detecting element in its movement path or, more specifically, the speed or RPM of the element, constitutes a magnitude of specific relationship to the parameter to be measured. Such flow meters usually lack conventional bearings, and the movements of the detecting element are often registered by non-mechanical means.

Known flow meters of this type, which are normally intended for small volume flows, are encumbered with a number of disadvantages, primarily occasioned by the design of the flow meter measuring chamber and by the forced movement of the detecting element around the circular wall of the chamber. With the aforementioned constructional design of such flow meters, i.e. with flow meters having a circular chamber provided with one or more inlets extending towards the interior of the chamber, the detecting element, such as a detecting ball for example, is forced to pass the incoming jets of medium each time it complets one lap of its circuit. This means that each time the ball passes the stream of incoming medium it leaves the regions of the circular chamber in which the speed of the medium is lowest and is forced into a region, i.e. the incoming jet of medium, where the speed of the medium is at a maximum. Thus, the ball is subjected to strong, uncontrolled acceleration forces which result in heavy impacts between the walls of the chamber and the ball. In consequence, the ball and chamber walls rapidly become worn and the flow meter will operate with a high level of sound and a high pressure drop and furthermore with a non-linear relationship between the flow parameters and the orbiting or circulating speed of the ball. Further, the circular form of the chamber renders it impossible to maintain a symmetrical flow through the chamber, i.e. to maintain a flow pattern in which the medium passes through the chamber in uniform, spiral-shaped flow lines. The medium will follow the circular wall and be forced into flow lines which deviate from the desired spiral path to varying degrees at different points around the circumference of the wall. This causes the speed of the ball to vary in orbit, resulting in the disadvantage of uneven wear.

The object of the present invention is therefore to provide a simple and inexpensive vortex-type flow chamber for flow meters capable of measuring flows of practically any volume, and to provide a flow meter which is silient in operation and with which the danger of uneven wear in the system is practically non-existent. A further object of the invention is to provide a flow chamber with which the speed of the medium through a certain chamber region in which measurements can be taken is linearly dependent to a very high degree on the flow parameters. Still another object of the invention is to provide a flow chamber with which the speed of the medium within the aforementioned region is subjected to fluid amplification, so that the speed of the medium within said region greatly exceeds the speed of the medium at the chamber inlet. A flow meter of the aforementioned type provided with a flow chamber which fulfills all the above objects provides a flow meter which is insensitive to external acceleration forces acting on the flow meter, which is silent in operation, has a low pressure drop and a high degree of linearity and reproducibility, and which has a wider working range than previously known flow meters of the type described.

These objects are obtained and the aforementioned disadvantages eliminated with the flow meter of the present invention, as defined in the accompanying claims.

The invention will now be described in detail with reference to a number of embodiments thereof illustrated by way of example only in the accompanying drawings, in which

FIG. 10 shows a flow meter including a measuring chamber according to the invention but equipped with a modified sensing element, whereas

FIGS. 10b and 10c show modified details of the sensing element according to FIG. 10 or 10a.

FIG. 11 is a cross sectional view taken through the line XI—XI in FIG. 10, whereas FIG. 12 is a cross sectional view similar to FIG. 11 but showing a modification of the indicating device according to this Figure Finally.

Figure 1:
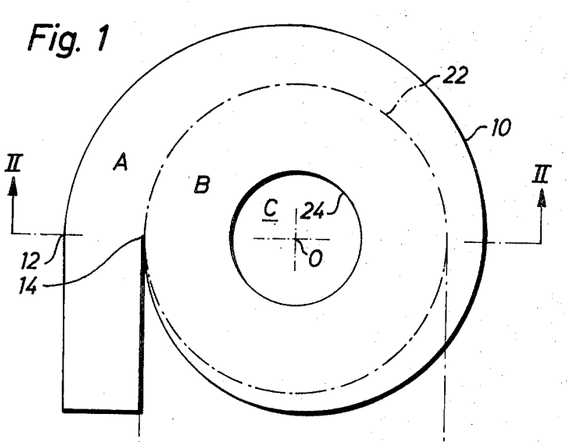
FIG. 1 is a horizontal sectional view taken through a measuring chamber constructed in accordance with the invention and illustrates diagrammatically the internal geometrical design of the chamber.
Figure 2:
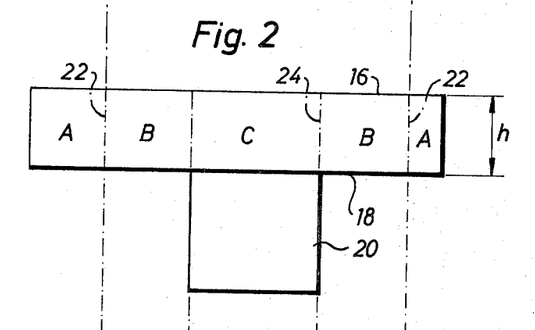
FIG. 2 is a sectional view taken through the line II—II in FIG. 1.

FIG. 1 and 2 thus illustrate diagrammatically the internal geometrical form of the flow meter chamber constructed in accordance with the invention. When seen in plan view, the chamber is outwardly defined by a wall 10 which extends from the outer side 12 of the mouth of an inlet passage and passes in spiral form around the chamber, the centre of which is located at 0, and terminates at the inner side 14 of the inlet opening, the spiral form preferably being logarithmic. When seen in cross section, as shown in FIG. 2, the chamber is defined by upper and lower planar walls 16 and 18. The central portion of the chamber is connected with an axially extending outlet 20 arranged concentrically with the chamber and which in the illustrated embodiment is connected to the lower wall 18. With respect to the properties of the flow field in the chamber, the interior of the chamber is conceived to be divided into an inlet zone A, a sensing or detecing zone B and an outlet zone C, the inlet zone and the sensing zones being separated by an imaginary cylindrical surface extending concentrically with the outlet and located substantially tangential to the inlet passage at the inside 14 of the mouth of the passage, this boundary or fluid interface being shown at 22. In a similar manner, the sensing and outlet zones B and C respectively are separated by an imaginary cylindrical surface or fluid interface, which comprises an imaginary extension of the cylindrical outlet 20 extending into the chamber, as shown by the reference numeral 24.

With the described chamber construction, the medium flowing in the tapering inlet zone A, having logarithmic spiral form, will pass obliquely into the sensing zone B in a manner such that the same flow conditions prevail throughout the entire fluid flow as it passes the boundary surface or interface 22 between the zones, i.e. the medium will pass the interface in a direction such that the whole flow enters the sensing zone at the same angle to a radius to the centre O of the outlet, and at a speed of equal magnitude, at any point along the interface 22. Further, the medium flow through the chamber, comprising planar, mutually parallel walls, is practically totally void of axially directed components. To provide for the measurement of flow parameters, the sensing zone B is intended to accomodate a movement detecting element, and with the following exemplary embodiments of the invention the sensing zone B has arranged therein a movable element which is caused to move under the influence of the through flowing medium along a circular path concentrical with the chamber. The aforementioned uniform inflow of the medium, with subsequent symmetrical flow in the sensing zone, constitutes a basic feature of the invention and forms the basis on which the highly desirable linearity in the measurements obtained with the flow meter of the invention but not previously obtained with known flow meters, is afforded, i.e. that the indications given by the sensing element within all practical limits are directly proportional to a high degree with the speed or volume flow of the through flowing medium.

In order that the invention may be better understood, this relationship between the flow in the sensing zone B and the measurement linearity will be explained in more detail with reference to FIGS. 3–5.

Figure 3:
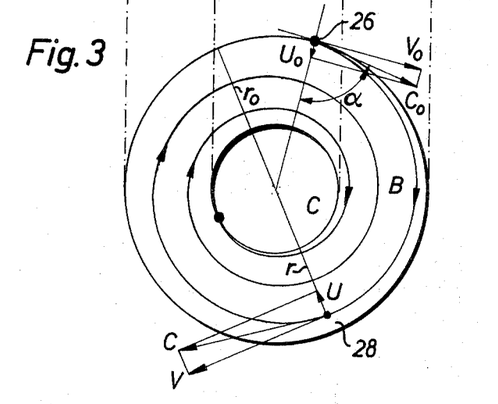
FIG. 3 illustrates the flow field within a portion of the chamber.

Thus, FIG. 3 illustrates how a fluid particle of the flowing medium, which enters the sensing zone B at an arbitrarily selected point 26 in a direction which forms the angle $\alpha$ with the radius, approaches the outlet zone C along a spiral path, the fluid particle passing a number of revolutions around the zone B before reaching the outlet. The velocity of the particle as it enters the sensing zone is designated $C_o$ and is divided into a tangential component $V_o$ and a radial component $U_o$. At a further arbitrarily selected point 28 of radius r along the path of particle movement the velocity of the particle is C with the tangential and radial components V and U respectively. The latter components are responsible for the transpoart of the medium through the measuring chamber, and when considering a specific meter having specific dimensions, i.e. a chamber having a height $h$ and with the radius of the sensing zone equal to $r_o$, the flow volume $q$, i.e. the volume of medium flowing through the chamber per unit of time will have the following relationship, owing to reasons of continuity and to the symmetry obtained in the inlet zone:

$$q = 2\pi R_o \cdot h \cdot U_o$$

When observed in accordance with fluid mechanics, the radial inflow of medium into the sensing zone has a Reynolds number $Re = U_o\, r_o/\epsilon$, where $\epsilon$ is the apparent viscosity of the medium with laminar or turbulent flow within the sensing zone. Conventional flow equations can be used to define the flow of the medium within the sensing and outlet zones, and FIG. 4 graphically illustrates one solution of these equations for a number of values of Re in the form of curves showing the tangential velocity V as a function of the chamber radius r, the relative values $V/V_o$ and $r/r_o$ being given in order to obtain dimensionless points of reference. It should be noticed that the different curves also represent different values of $q$, since the above expression for q can be written:

$$q = 2\pi R_O \cdot H \cdot U_o = 2\pi h \cdot R_e \cdot \epsilon = {}^{const.} Re$$

As can be seen, deviations occur between the portions of the curves lying generally within the region $r/r_o = 0$ to $r/r_o = 0.3 - 0.4$, thus generally within the outlet zone C. The boundary line 24 between the sensing zone B and the outlet zone C is shown in the diagram.

Figure 4:
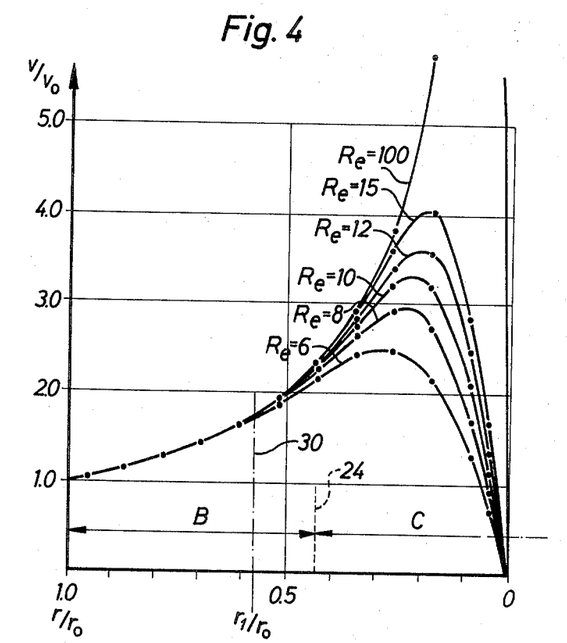
FIGS. 4 and 5 are diagrams showing the course of flow within said portion of the chamber.
Figure 5:
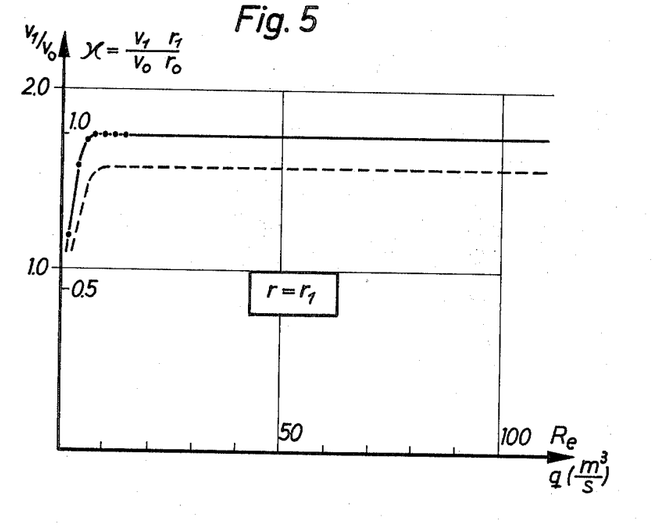

If the flow is considered at an arbitrarily selected radius $r_1$ within the sensing zone, indicated by the line 30 inserted in FIG. 4 at the value $r_1/r_o$, and the tangential velocity $V_1$ at this radius is drawn (thus in the form of relative velocity $V_1/V_o$) as a function of Re, and therewith of $q$, the curve illustrated in FIG. 5 is obtained. When Re has very low values, $V_1/V_o$ changes with Re to rise to a constant value applicable to Re greater than approximately 6. This value of Re corresponds to a minimum flow volume $q_{min}$, and for all greater values on $q$, the ratio $V_1/V_o$ is thus constant, i.e. $V_1 = $ const. $V_o$. But $V_o$, owing to the uniform distribution of the medium created by the inlet zone, is directly proportional to the flow volume $q$, wherein $V_1$ is also directly proportional to $q$, i.e.

$$V_1 = \text{const.}\ q.$$

But $r_1$ was an arbitrarily selected radius within the sensing zone and hence the above discussion is applicable to any radius within this zone, i.e. the desired linear relationship between V and $q$ is true for the whole of the sensing zone. Alternatively, the linearity can also be expressed so that when $q$ is greater than $qx_{min}$ the angular momentum $\mu = V_1 r_1 / V_o r_o$ is constant and independent of the flow volume $q$ within the sensing zone, since the relative angular momentum for the radius $r_1$ is only a constant multiplied by $V_1/V_o$.

Practical tests have shown that a flow meter having a flow chamber constructed in accordance with the invention is linear to a very high degree within the whole of the intended flow range. An interesting circumstance in this respect is the influence which wall friction exerts in practice. The result of such friction is to slightly displace the curves shown in FIG. 4 downwardly, and in correspondence herewith the curve illustrated in FIG. 5 will be lowered somewhat as shown with the dash line, although it is significant and characteristic of the flow chamber that the linearity is not lost as a result of the wall friction. Practical tests have also shown that, if desired, the sensing zone can be extended without disadvantages to a radius slightly less than the radius of the outlet.

Finally, it should be mentioned with respect to the relationship illustrated in FIG. 5 that the constant value assumed by the relative velocity $V_1/V_o$ is greater that 1 throughout the whole sensing zone. This implies that an advantageous fluid mechanical amplification of flow is obtained, i.e. that a sensing element, for example in the form of a freely movable ball or the like placed within the sensing zone, will be propelled around the zone at a speed which is considerably higher than the average speed of the medium when flowing into and out of the flow meter. This is also illustrated in FIG. 3, which shows how a fluid particle moves trugh a number of revolutions — in the illustrated case approximately three — at increasing speed within the sensing zone before reaching the outlet. Further, with the arrangement of the present invention, the sensing element need never pass through or be contacted by any of the incoming jets of medium and thereby subjected to wearing impacts etc. Owing to the fact that the medium flows freely without meeting obstacles in the form of speed reducing pockets or elements which cause an abrupt change in the direction of flow, the losses in the different zones are low.

Figure 6:
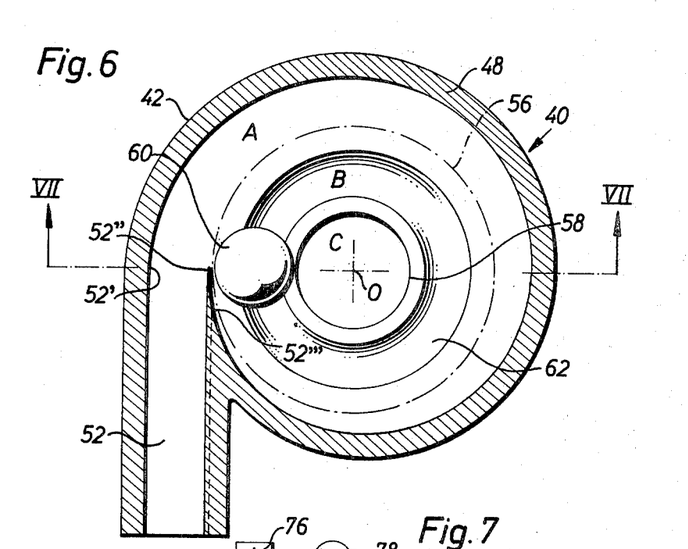
FIG. 6 is a horizontal sectional view taken through a flow meter provided with the chamber illustrated in FIGS. 1 and 2, the section being taken through the line VI—VI in FIG. 7, which is a cross-sectional view taken through the line VII—VII in FIG. 6.
Figure 7:
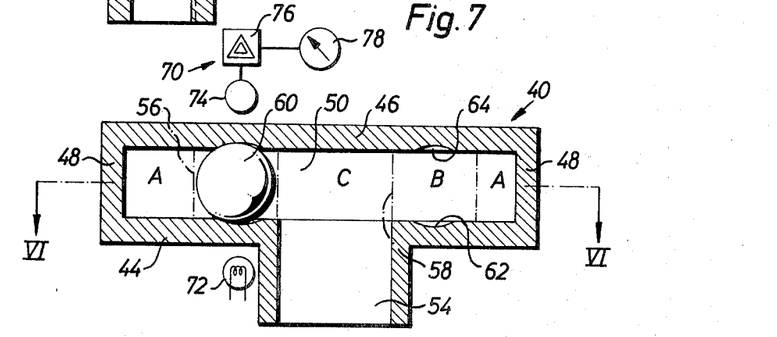

The flow chamber illustrated in FIGS. 1 and 2 can be applied in practice to a flow meter of the type illustrated diagrammatically in FIGS. 6 and 7. The flow meter of the embodiment illustrated in FIGS. 6 and 7 is generally shown at 40 and includes a housing 42 which comprises mainly a bottom or lower wall portion 44 and a cover or upper wall portion 46, the wall portions being arranged parallel to one another and maintained at a determined distance apart by means of the spiral wall 48. The bottom 44, the cover 46 and the side wall 48 together define a chamber 50 having a tangentially directed inlet 52 and a centrally arranged outlet 54, which may be arranged in the bottom 44. The inlet 52 may be of rectangular or square cross section and is adapted to the walls of the spiral-shaped chamber so as to avoid the occurrence of abrupt changes in cross-sectional area, whereby the medium can be introduced into the chamber without disturbing losses or axial flows.

In accordance with the aforegoing the chamber 50 may be divided into an inlet zone A, a sensing zone B and an outlet zone C having a common centre at O, the border between the two first mentioned zones being formed by a cylindrical surface 56 concentrically arranged with the zones and having a radius corresponding to the distance between the centre O and the radial inner edge 52″ of the inlet. The border separating the sensing zone B and the outlet zone C is in the form of a cylindrical surface 58 which forms an imaginary extension of the outlet 54 into the chamber. The outwardly defining wall of the inlet zone is formed by the spiral chamber wall 48, which extends along a preferably logarithmic spiral and departs from the radial outer edge 52′ of the inlet and extends through 360° around the chamber and terminates at the radial inner edge 52″ of the inlet, the pitch of the spiral thus coinciding with the width of the inlet. For practical reasons, taking into account the thickness of the material from which the flow meter is constructed, the inner edge of the inlet can be displaced somewhat, as illustrated at 52‴ in FIG. 6, i.e. so that the spiral does not extend through a full 360° around the chamber.

As previously mentioned, the logarithmic spiral shape of the chamber wall enables the basic condition of operation for the inlet zone to be fulfilled, namely that the speed at which the medium flows into the sensing zone B is uniform throughout and and takes place in a direction which forms substantially throughout the same angle with a radius to the centre O. It should be mentioned, however, that these conditions can also be fulfilled in practice with spirals other than logarithmic spirals, for examples with an Archimedean spiral or with intermediate spiral forms between said two spirals. Further, the sensing zone is defined by the two wall portions 44 and 46. which are preferably located in paralle planes, in a manner such that the medium during its circulatory movement towards the outlet is guided so that no axial movement is obtained. The condition that the wall portions are located in parallel planes can be discounted, however, provided that occurring axial velocities are small in relation to remaining velocity components within the sensing zone B, as will be described below with reference to FIG. 7a.

In the exemplary embodiment, the sensing element is in the form of a ball 60 which is guided by circular, shallow grooves 62 and 64 arranged in the wall portions 44 and 46 respectively of the chamber 50, for example as described in my copending application Ser. No. 302,038.

The ball lightly engages the grooves and follows the same around a circular path in the sensing zone B of the chamber 50 while activated by the medium circulating within the zone, although without meeting the jet of incoming medium from the inetl 52. The speed of the ball, or its orbiting rate, thus presents a very high degree of reproduceable linearity to the flow parameters of the medium passing the sensing zone. As previously mentioned, practical tests have shown that a flow meter provided with a chamber according to the invention is linear over the whole of the rated working range, which because of the low pressure drop obtained with the chamber can be extended much further than what is normal for flow meters of conventional design.

There are several known methods by which movement of the ball can be indicated, primarily the number of revolutions of the ball per unit of time, or its orbiting speed. One example of such methods is the photoelectrical arrangement 70 diagrammatically illustrated in FIG. 7, having a light source 72, a photocell 74, an electronic converter 76 and an indicator 78. For a more detailed description of this and other measuring arrangements, reference is made to the aforementioned patent application.

Figure 7A:
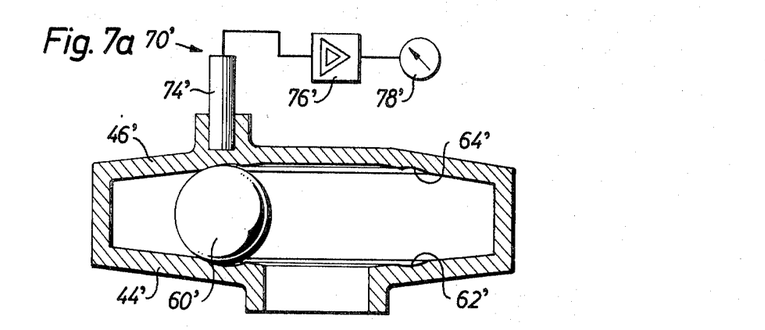
FIG. 7a is a cross-sectional view similar to FIG. 7 but shows a modified measuring chamber.

As indicated above it is not necessary that the measuring chamber according to the invention is provided with truly parallel end wall portions; a structure of the type illustrated in FIG. 7a may also be used. The chamber shown in this Figure corresponds generally to that shown in FIG. 7, and also in this case a ball 60' is used as sensing element, the ball being guided in grooves 62' and 64'. As shown in FIG. 7a, however, the end walls 44' and 46' are somewhat dished in such a way that their outer portions form a certain angle with each other, as is evident from the Figure. By such a design it is possible to make the cross sectional area of the inlet smaller in relation to the ball, a feature which is advantageous in certain cases.

In FIG. 7a there is also shown, in a diagrammatic manner, an alternative arrangement 70' for indicating the movement of the ball. The photoelectrical device 70 is replaced here by a system operating on induction, an inductive transducer 74' being actuated by the passing ball 60', which generates at each passage a pulse in the transducer 74'. THe pulse is conducted to an electronic converter 76' and an indicator 78', for instance, a pointer-type instrument.

Figure 8:
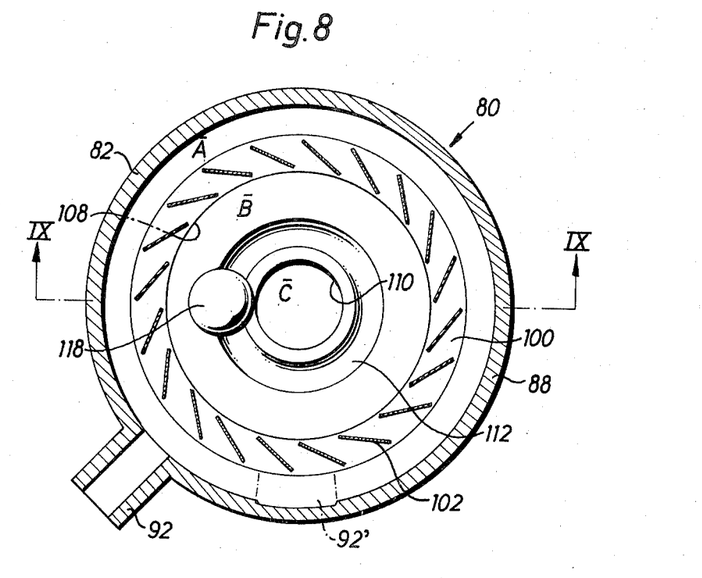
FIG. 8 shows diagrammatically a horizontal section through a flow meter provided with a flow chamber according to a second embodiment of the invention, the section being taken through the line VIII—VIII in FIG. 9, which is a cross-sectional view taken through the line IX—IX in FIG. 8.
Figure 9:
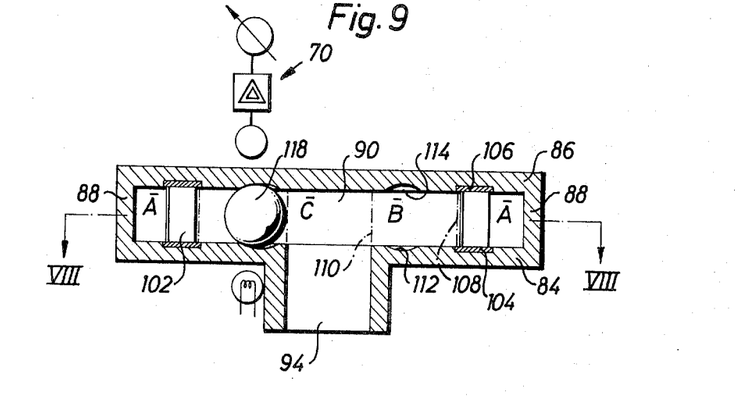

FIGS. 8 and 9 illustrate diagrammatically a second embodiment of a flow meter provided with a flow chamber constructed in accordance with the invention. The illustrated flow meter 80 coincides with the flow meter illustrated in FIGS. 6 and 7 inasmuch as the sensing and outlet zones of the two chambers are identified, while the inlet zone can be of relatively arbitrary construction, in the illustrated case of annular construction. The flow meter 80 includes a housing 82 having a lower and an upper wall portion 84 and 86 and a substantially circular or cylindrical side wall 88 encircling a measuring chamber 90. The housing has an inlet 92, which in the illustrated case need not be tangentially directed but may be radially or, as indicated by dash lines at 92', axially positioned and placed in the bottom 84 of the housing 82. As with the previous embodiment, the illustrated flow meter is provided with an axial outlet 94 arranged in the bottom of the housing.

For the purpose of guiding the flow of medium into the sensing zone of the flow meter illustrated in FIGS. 8 and 9 and for the purpose of ensuring complete symmetry of flow in accordance with the basic concept of the invention, i.e. that the medium flows from the inlet zone at a constant angle and at constant speed, a system of guide vanes in the form of guide vane ring 100 is arranged in the chamber 90 concentrically with the housing and with the centre 0. The guide vane ring comprises a large number of thin, straight or curved vanes 102, for example mounted between a lower ring 104 and an upper ring 106, the rings being let into the walls 84 and 86 of the housing so that the vanes extend between the wall portions. All the guide vanes are uniformly positioned around the circumference and are mutually similar in construction and position, so that radii from the centre O from the outlet to identical points on the guide vanes intersect the vanes at the same angle.

As with the embodiment previously described, the measuring chamber 90 is divided into an inlet zone, a sensing zone and an outlet zone, indicated by the references $\bar{A}$, $\bar{B}$ and $\bar{C}$ respectively. The border separating the inlet zone and the sensing zone is in the form of a cylindrical surface 108 located immediately and radially inwardly of the guide vane ring, while the border between the sensing zone $\bar{B}$ and the outlet zone $\bar{C}$ is formed by a cylindrical surface 110 representing an extension of the outlet. The inlet zone $\bar{A}$ is defined outwardly by the side wall 88 of the housing which wall in the illustrated embodiment is substantially cylindrical in shape. It will be evident from the aforegoing that the basic condition for medium flow into the sensing chamber is fulfilled by means of the guide vane ring 100, which guides the medium uniformly in the desired direction and at the desired, uniform speed. As indicated above, the described arrangement enables the housing and inlet connections of the flow meter to be constructed according to prevailing conditions. The portion of the inlet zone $\bar{A}$ connected outside the guide vane ring forms a pressure equalizing chamber for the medium flowing in through the inlet 92, therewith affording considerable freedom when constructing the outer defining walls of the chamber and the inlet connections thereto. As with the embodiment illustrated in FIGS. 6 and 7, the sensing element is shown in the form of a ball 118 which is guided in grooves 112 and 114 disposed in the walls 84 and 86 respectively of the flow meter and which is caused to accompany the medium passing through the sensing zone $\bar{B}$ linearly and with great precision. The speed or orbiting rate of the ball 118 is sensed in a suitably manner e.g. by an photoelectric arrangement 70, which is equivalent to the arrangement illustrated in FIG. 7.

Figures 10, 10B, 10C, 11, 12:
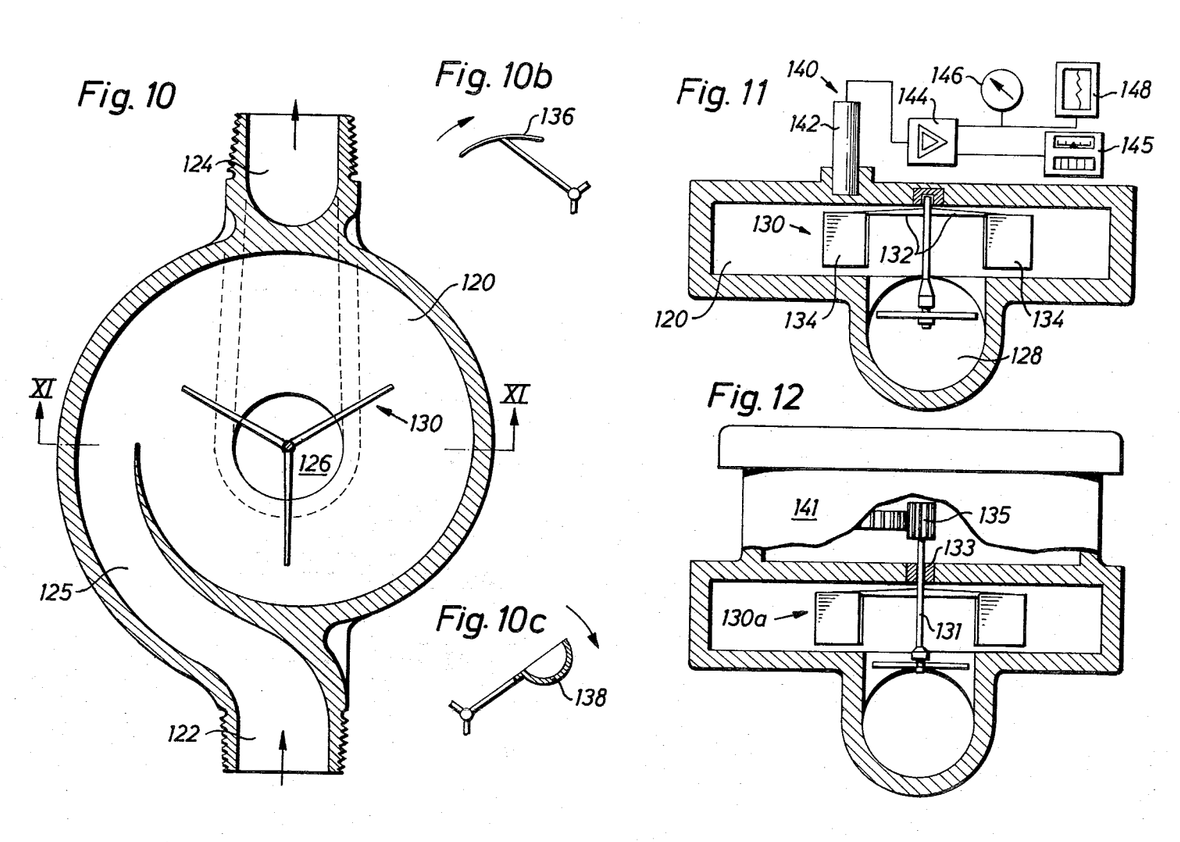
Figures 10A, 13:
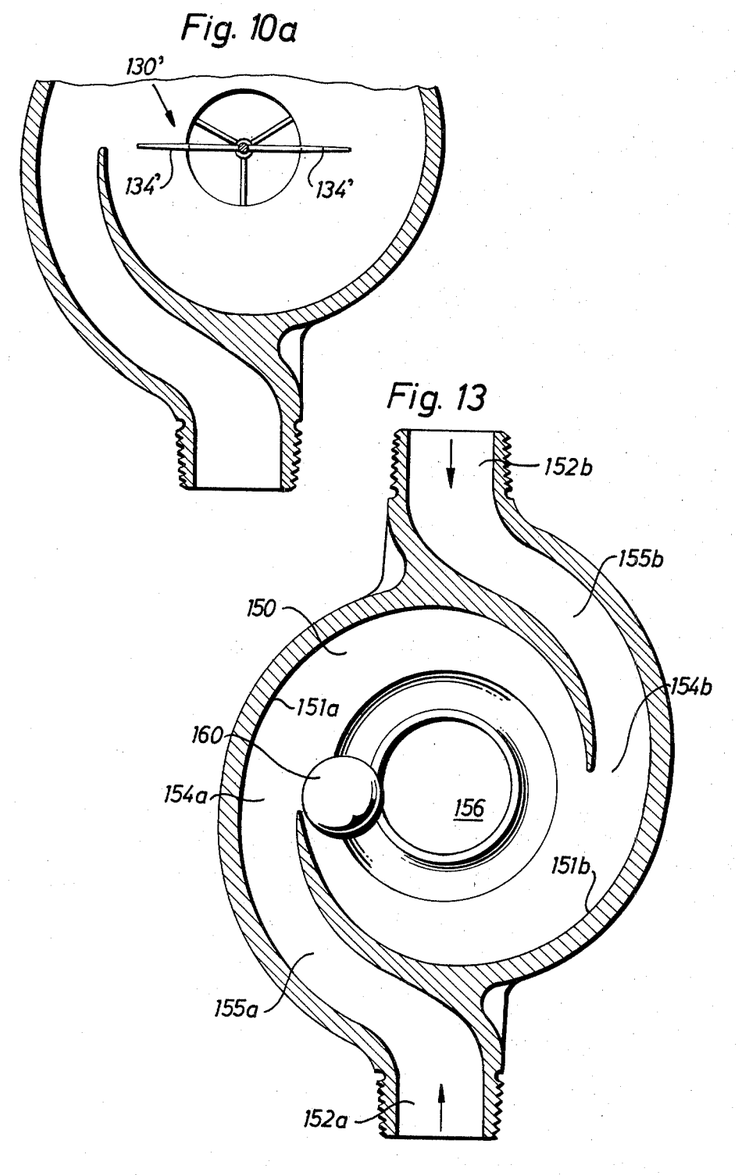
FIG. 10a shows the same measuring chamber with a sensing element further modified.
FIG. 13 shows a flow meter having a measuring chamber according to the invention provided with double inlets.

In the embodiments disclosed above of a flow meter having a measuring chamber according to the invention, a ball orbiting in the chamber has been used as sensing element, substantially as disclosed in my above-mentioned copending application. However, it is of course also possible to use other types of sensing elements, as shown by way of example in FIGS. 10–12. Thus there is shown in FIG. 10 a flow meter including a measuring chamber 120, whose side walls forms a logarithmic spiral according to the invention. In this case it will be seen that the inlet 122 and outlet 124 are coaxial, an inflow channel 125 from the inlet 122 extending along a part of the measuring chamber 120 outside thereof to open tangentially in the chamber in the same manner as in the embodiment of FIG. 6. The outlet opening 126 coaxial with the chamber merges into a bent outflow channel 128 which leads to the outlet 124 coaxial with the inlet 122. In this case the sensing element consists of a rotor in the form of a paddle wheel or impeller 130 carried in central bearings. The impeller is a light spider structure, the material thereof preferably having the same density as the medium to be measured. The structure consists of three arms 132 secured in a central hub, said arms carrying each at its outer end a small blade or paddle 134 which is caused to follow the flow in the same manner as the sensing ball in the aforegoing embodiments. In FIG. 10 there is shown an impeller 130 having three blades 134 while FIG. 10a shows a lighter structure 130' having only two blades 134'. Generally the design of the impeller may be adapted and adjusted in accordance with prevailing conditions, with respect to the number of blades as well as the shape thereof. In FIGS. 10b and 10c there are shown two examples of paddle shapes other than that of the flat blade, FIG. 10b thus showing a slightly bent blade or paddle 136 whereas FIG. 10c shows a cup-formed or part-spherical paddle 138. The paddle or blade shape may be adjusted optionally to affect the torque to which the impeller 130 or 130' as a whole is subjected.

As may be seen in FIG. 11 the paddle wheel or impeller 130 is mounted freely rotatable in central bearings in the chamber 120, its movements, more particularly its absolute number of revolutions or its RPM, being indicated in analogy with the arrangement according to FIG. 7a, that is, by means of an inductive system 140 including a transducer 142. The transducer senses each paddle blade passage and generates a pulse which is conveyed to a converter 144 producing a digital as well as an analogue output signal, whereof the digital signal is supplied to an integrator or adding mechanism 145 whereas the analogue signal is supplied to a pointer instrument 146 and a recorder 148.

Alternatively, indicating and recording of the movements of the impeller may be carried out by means of a mechanical counter, as illustrated diagramatically in FIG. 12. In this case the shaft 131 of the impeller or motor 130a is extended and passes through a bearing 133 in the cover of the casing of the meter. In its free end the shaft is provided with a small gear 135 driving in known manner a counter mechanism 141. The impeller 130a is so constructed with regard to the shape of the blades and the number thereof that it will supply the torque necessary for driving the counter mechanism without disturbing the linearity, previously discussed, of the medium flow through the measuring chamber.

To illustrate the structural variability and versatility of the invention there is shown in FIG. 13, by way of conclusion, a flow meter including a measuring chamber 150 according to the invention which may be utilized at the same time as a very efficient mixing or blending chamber. In this case the meter is provided with two inlets 152a and 152b communicating with inflow channels 155a and 155b, respectively, which open tangentially in the measuring chamber 150 in the same way as the inflow channel 125 of FIG. 10. The wall of the measuring chamber 150 is logarithmically spiral formed as before but divided into two sections 151a and 151b so as to exhibit two diametrically opposed inlet openings 154a and 154b as shown in FIG. 13. The flow in the measuring chamber 150 is sensed in this case by a ball 160, and the media flowing in through the respective inlets 152a and 152b will be efficiently mixed in the chamber 150, after which they leave through the common outlet opening 156. Hereby the ball 160 will indicate the sum of their flow volumes.

In the present invention, the ratio between the diameter of the outlet zone and the maximum diameter of the inlet zone is preferrably at least 0.15, and the ratio between the diameter of the outlet zone and the diameter of the sensing zone is preferrably at least 0.25.

The invention provides for a flow meter intended for arbitrary flow volumes a vortex chamber which is simple and inexpensive to manufacture and which is insensitive to disturbances. A flow meter provided with the flow chamber of the present invention operates with practically complete linearity and reproduceability, and at the same time is practically soundless and has a low pressure drop and wide working range.

The invention is not restricted to the illustrated and described embodiments, but can be modified within the scope of the following claims.

What I claim is:

1. A flow meter for liquid and gaseous and multicomponent media, comprising:
   housing means forming therein a substantially cylindrical flow chamber free from flow obstructions;
   inlet means associated with said housing means for permitting a fluid medium to be supplied to said chamber;
   outlet means associated with said housing means in substantial coaxial alignment with said chamber for permitting said fluid medium to flow outwardly from said chamber;
   sensing means associated with said chamber for measuring or indicating a desired flow parameter of said medium, said sensing means including a sensing element positioned within said chamber;
   said chamber having an outer substantially annular inlet zone for receiving therein the inflowing medium, and said inlet means communicating with said inlet zone;
   said chamber further having an annular ringlike sensing zone located radially within said inlet zone and containing therein said sensing element, said sensing zone being defined by an outer circumferentially extending peripheral boundary which defines an open interface area between said inlet and sensing zones with said open interface area extending circumferentially of said sensing zone throughout a substantial arcuate extent;
   said chamber also having a central outlet zone located radially within said sensing zone and disposed in communication with said outlet means;
   said housing means having a pair of spaced end walls which commonly define therebetween the opposite axial ends of said sensing zone and said outlet zone, said end walls having even surfaces thereon free of flow obstructions; and
   guide means associated with said inlet zone for guiding the flowing fluid medium from said inlet zone into said sensing zone substantially uniformly throughout the open interface area between the inlet zone and the sensing zone along substantially the total height of said sensing zone and along substantially the total length of the arcuate extent of said open interface area, said guide means causing said fluid medium to flow from said inlet zone into said sensing zone (1) in a direction substantially coinciding with a plane perpendicular to the central axis of said chamber and forming throughout the outer boundary of said sensing zone substantially the same angle to a tangent to said boundary and (2) at a speed which is substantially the same throughout said boundary, and said sensing element as disposed within said sensing zone being disposed radially inwardly from said inlet zone so as to be acted upon by said flowing medium without causing any appreciable effect on the speed and direction of said flowing medium.

2. A flow meter according to claim 1, wherein said inlet zone is defined in the axial direction by the same end walls as the sensing and outlet zones, and said inlet means including at least one inlet passage communicating with said inlet zone and extending substantially tangentially relative to said inlet zone, and said guide means being defined by a guide wall which is straight in the axial direction of the chamber and extends from the radially outer side of the inlet passage in a spiral form along the outer periphery of the inlet zone, said guide wall being spaced radially outwardly from said sensing zone such that an imaginary extension of the inlet passage does not intersect the sensing zone, whereby the stream of incoming fluid medium as supplied through said inlet passage into said inlet zone will not directly impinge on said sensing element but will be continuously urged by said guide wall of spiral form to enter the sensing zone in a uniformly guided manner.

3. A flow meter according to claim 2, wherein said inlet passage has a substantially rectangular cross section with a pair of opposite sides thereof being substantially level with the respective opposed end walls so that the flow of fluid medium through said inlet passage into said inlet zone takes place without abrupt changes in the cross-sectional area of the flow.

4. A flow meter according to claim 2, wherein the spiral form is selected from the group consisting of logarithmic form, Archimedean form, or a form which lies between the logarithmic and Archimedean forms.

5. A flow meter according to claim 1, wherein said inlet means includes a single inlet communicating with said inlet zone, and said guide means comprising a guide wall extending axially between said end walls and extending radially from the radially outer side of said inlet in a spiral form around said inlet zone through an angle of substantially 360° and terminating adjacent the radially inner side of said inlet, said annular sensing zone being positioned radially inwardly from the portion of said guide wall which terminates adjacent the radially inner side of said inlet, said inlet being disposed substantially tangentially relative to said inlet zone so that an imaginary extension of said inlet does not intersect said sensing zone.

6. A flow meter according to claim 1, wherein said guide means comprises a circular guide vane system concentrically encircling and substantially defining the outer boundary of said sensing zone, said system including a plurality of thin guide vanes uniformly spaced around the periphery of said sensing zone and forming the same angle with respect to a radius extending outwardly from the center of said outlet means.

7. A flow meter according to claim 1, wherein said housing means includes a substantially cylindrical wall defining the outer periphery of said inlet zone, and the ratio between the diameters of the outlet zone and the inlet zone being not less than 0.15.

8. A flow meter according to claim 1, wherein the ratio between the diameters of the outlet zone and the sensing zone is not less than 0.25.

9. A flow meter according to claim 1, wherein said sensing element comprises a ball located within said sensing zone, and guiding means associated with said sensing zone for positively guiding said ball along a circular path which is concentric with and surrounding said outlet zone, said path being spaced radially inwardly from said inlet zone.

10. A flow meter according to claim 1, wherein said sensing element comprises a rotary member rotatably supported on said housing means and disposed within the center of said chamber, said rotary member having vane means mounted thereon and located within said sensing zone.

11. An improved flow meter for indicating or measuring at least one flow parameter of a flowing fluid medium, comrpising:
  housing means including a pair of spaced end walls and defining a flow chamber therebetween having (1) a substantially cylindrical outlet zone defined between said end walls and disposed centrally of said chamber, (2) an annular ringlike sensing zone defined between said end walls and disposed concentric with and in surrounding relationship to said outlet zone, and (3) a substantially annular inlet zone defined between said end walls and disposed in surrounding relationship to said sensing zone;
  said sensing zone and said outlet zone being in free and open communication with one another throughout the complete peripheral interface therebetween with said peripheral interface being free of flow obstructions so that said sensing zone and said outlet zone effectively form a single substantially cylindrical compartment as defined between said end walls, and said sensing zone and said inlet zone having an elongated circumferentially extending open interface area therebetween for permitting free and open communication between said zones;
  inlet means in communication with said inlet zone for permitting flow of said fluid medium into said inlet zone;
  outlet means communicating with said outlet zone for permitting discharge of said fluid medium therefrom, said outlet means including an outlet opening formed in one of said end walls in coaxial alignment with said outlet zone;
  sensing means disposed within said sensing zone for measuring or indicating at least one of the flow parameters of said medium, said sensing means including a sensing element disposed within said sensing zone; and
  guide means associated with said inlet zone and defining one of the circumferentially extending peripheral boundaries thereof for directing and guiding the flowing medium into the sensing zone throughout the length of the circumferentially extending interface area between the inlet zone and the sensing zone, said guide means directing said medium into said sensing zone in a direction substantially coincident with a plane which is substantially perpendicular to the central longitudinal axis of said chamber with said flowing medium forming throughout the periphery of said sensing zone substantially the same angle relative to a tangent to the periphery of said sensing zone.

12. A flow meter according to claim 11, wherein said guide means comprises guide wall means fixed to and extending axially between said end walls, said guide wall means extending peripherally around said chamber through an angle of approximately 360° and defining the outer boundary of said inlet zone, said guide wall means including an elongated peripherally extending wall having a spiral form.

13. A flow meter according to claim 12, wherein said inlet means includes an inlet opening which opens into said inlet zone and is directed so that the flow therethrough occurs in a direction tangentially of said inlet zone, said inlet opening being directed so that an imaginary extension thereof in the flow direction does not intersect the sensing zone whereby the inflowing fluid medium does not directly impinge on the sensing element.

14. A flow meter according to claim 13, wherein said sensing element comprises a movable member positioned within said sensing zone and means guidingly supporting same within said sensing zone for movement within a circular path, said guidng means positively maintaining said movable member out of engagement with said guide wall means with said movable member being normally spaced radially inwardly a substantial distance from said guide wall means throughout at least a majority of the peripheral extent of said guide wall means.

15. A flow meter according to claim 11, wherein said inlet zone comprises an annular ringlike zone disposed concentric with and in surrounding relationship to said sensing zone, said housing means including a substantially cylindrical ringlike wall extending between said end walls and defining the outer boundary of said inlet zone, and said guide means including a circular guide vane system disposed concentrically within said ringlike wall and spaced radially inwardly therefrom by a substantial distance so as to define said inlet zone therebetween, said circular guide vane system defining the boundary between said inlet zone and said sensing zone and comprising a plurality of thin guide vanes distributed substantially uniformly around the outer periphery of said sensing zone for directing the flowing medium from said inlet zone into said sensing zone substantially uniformly around the complete periphery of said sensing zone.

* * * * *